(12) United States Patent
Isikdogan et al.

(10) Patent No.: US 11,024,002 B2
(45) Date of Patent: Jun. 1, 2021

(54) GENERATING GAZE CORRECTED IMAGES USING BIDIRECTIONALLY TRAINED NETWORK

(71) Applicant: INTEL CORPORATION, Santa Clara, CA (US)

(72) Inventors: Furkan Isikdogan, Santa Clara, CA (US); Timo Gerasimow, Santa Jose, CA (US); Gilad Michael, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 104 days.

(21) Appl. No.: 16/412,994

(22) Filed: May 15, 2019

(65) Prior Publication Data

US 2019/0266701 A1   Aug. 29, 2019

Related U.S. Application Data

(60) Provisional application No. 62/818,255, filed on Mar. 14, 2019.

(51) Int. Cl.
| | |
|---|---|
| *G06T 3/00* | (2006.01) |
| *G06K 9/62* | (2006.01) |
| *G06T 5/20* | (2006.01) |
| *G06T 7/73* | (2017.01) |
| *G06K 9/00* | (2006.01) |
| *G06T 5/00* | (2006.01) |

(52) U.S. Cl.
CPC .......... *G06T 3/0093* (2013.01); *G06K 9/0061* (2013.01); *G06K 9/6256* (2013.01); *G06K 9/6262* (2013.01); *G06T 5/006* (2013.01); *G06T 5/20* (2013.01); *G06T 7/73* (2017.01); *G06T 2207/30041* (2013.01); *G06T 2210/44* (2013.01)

(58) Field of Classification Search
None
See application file for complete search history.

(56) References Cited

U.S. PATENT DOCUMENTS

| | | | |
|---|---|---|---|
| 2013/0094866 A1* | 4/2013 | Pasquero | H04M 1/6066 398/202 |
| 2015/0312560 A1* | 10/2015 | Deering | A61F 2/1602 345/1.3 |
| 2017/0122725 A1* | 5/2017 | Yeoh | G06T 15/20 |

OTHER PUBLICATIONS

Eye Contact Correction using Deep Neural Networks, by Isikdogan et al., arXiv:1906.05378v2 [cs.CV] Dec. 26, 2019 (Year: 2019).*
Gaze correction for home video conferencing, by Kuster et al., ACM Transactions on Graphics, vol. 31 No. 6, Article 174 date Nov. 2012 (Year: 2012).*

(Continued)

*Primary Examiner* — Vikkram Bali
(74) *Attorney, Agent, or Firm* — Hanley, Flight and Zimmerman, LLC

(57) ABSTRACT

An example apparatus for correcting gaze in images includes an image receiver to receive an image comprising an eye and a target angle set to a center. The apparatus also includes a bidirectionally trained convolutional neural network (CNN) to receive the image and the target angle from the image receiver and generate a vector field and a brightness map based on the image and the target angle. The apparatus further includes an image corrector to generate a gaze corrected image based on the vector field and the brightness map.

24 Claims, 7 Drawing Sheets

(56) References Cited

OTHER PUBLICATIONS

Criminisi, A. et al: "Gaze Manipulation for One-to-one Teleconferencing" Proceedings Ninth IEEE International Conference on Computer Vision, date of conference Oct. 2003, Nice France, 8 pages.
Yang, R. et al: "Eye gaze Correction with Stereovision for Video-Teleconferencing" IEEE Transactions on Pattern Analysis and Machine Intelligence, vol. 26, issue 7, date of publication May 2004, 16 pages.
Kononenko, D. et al:"Learning to look up: Realtime Monocular Gaze Correction Using Machine Learning"; 2015 IEEE Conference on Computer Vision and Pattern Recognition (CVPR); date of conference Jun. 2015, Boston, MA, USA, 9 pages.
Ganin, Y. et al: "Deepwarp: Photorealistic Image Resynthesis for Gaze Manipulation"; European Conference on Computer Vision, Part of the Lecture Notes in Computer Sciencebook series (LNCS, vol. 9906) Springer, First Online Sep. 2016,1 page.
Wood, E. et al: "Learning an Appearance-Based Gaze Estimator from One Million Synthesised Images"; Proceeding ETRA '16 Proceedings of the Ninth Biennial ACM Symposium on Eye Tracking Research & Applications pp. 131-138 , Mar. 2016, Charleston South Carolina, USA.
Goodfellow, I. et al. "Generative Adversarial Nets" Machine Learning (stat.ML); Machine Learning (cs.LG), arXiv.org > stat > arXiv:1406.2661, Montreal AC, Jun. 2014, 9 pages.
Zhu, Jun-Yan et al. "Unpaired Image-to-Image Translation Using Cycle-Consistent Adversarial Networks" Published in: 2017 IEEE International Conference on Computer Vision (ICCV) Date of Conference Oct. 2017, Venice, Italy, 10 pages.

\* cited by examiner

200

GENERATING GAZE CORRECTED IMAGES USING BIDIRECTIONALLY TRAINED NETWORK

CROSS-REFERENCE TO RELATED APPLICATION

The present application claims the benefit of U.S. Provisional Patent Application Ser. No. 62/818,255 by Isikdogan, et al., which is titled "GENERATING GAZE CORRECTED IMAGES USING BIDIRECTIONALLY TRAINED NETWORK" and was filed Mar. 14, 2019, the disclosure of which is incorporated herein by this reference as though fully set forth herein.

BACKGROUND

Video conferencing systems enable users to remotely conduct face-to-face interactions. For example, one user may be using a laptop while another user may be using another computing device such as a smartphone.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
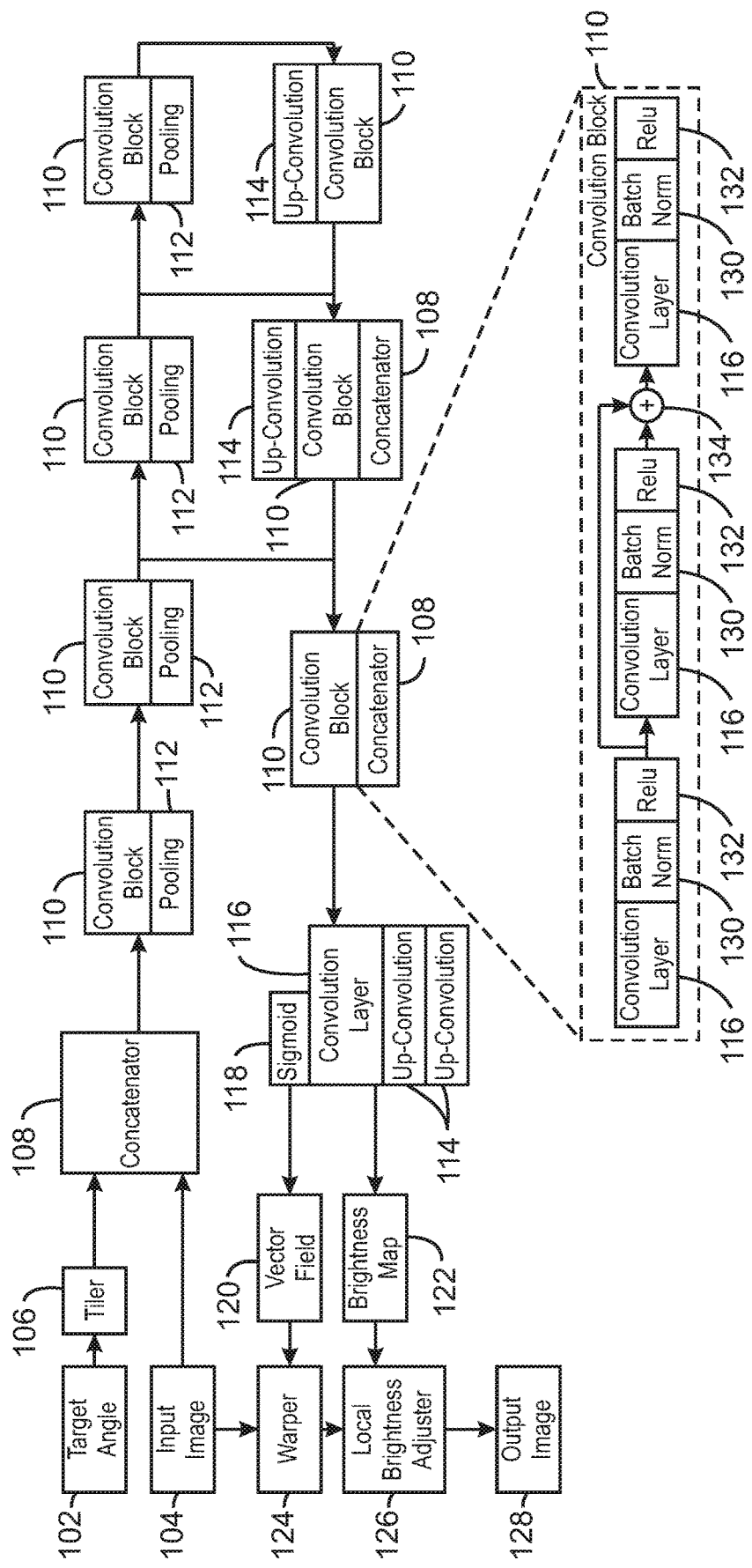
FIG. 1 is a block diagram illustrating an example system for generating gaze corrected images using a bidirectionally trained network.

As discussed above, video conferencing systems may be used to remotely conduct face-to-face interactions. For example, one user may face a video camera in a first device and another user may face a second video camera in a second device to conduct a conversation or an interview. However, it may be difficult to maintain eye contact during such interactions. For example, a first user may be looking at something on a display of their laptop rather than directly into the video camera. Thus, a second user may see the eyes of the first user looking away from the second user.

The present disclosure relates generally to techniques for correcting gaze in images. Specifically, the techniques described herein include an apparatus, method and system for correcting gaze in images using a bidirectionally trained network. An example apparatus includes an image receiver to receive an image comprising an eye and a target angle set to a center. For example, a facial landmark detector can locate and crop eyes in an image and feed them into the image receiver. The apparatus includes a bidirectionally trained convolutional neural network (CNN) to receive the image and the target angle from the image receiver and generate a vector field and a brightness map based on the image and the target angle. For example, the CNN may be a deep neural network. The CNN may be trained to receive the image and the target angle from the image receive and generate a vector field and a brightness map based on the image and the target angle. The apparatus further includes an image corrector to warp the input image based on the vector field to generate a gaze corrected image. The image corrector is to further adjust a local brightness of the warped image based on the brightness map to generate an enhanced gaze corrected image. In various examples, the image corrector outputs frames having smooth and naturally corrected gaze using a set of control mechanisms. For example, the control mechanisms can control the strength of the correction, and prevent unwanted side effects from overly corrected eye contact, and ensure temporal consistency in live applications. In some examples, the CNN further predicts an input gaze direction and magnitude. The predicted input gaze direction and magnitude can enable, for example, an application to dim the backlight of a screen of a device when the user is not engaged to increase battery life significantly. In some examples, this gaze information can also enable interactions without using the hands.

The techniques described herein thus enable a first user to perform tasks and look at various portions of a display while still appearing to be looking directly at a second user viewing the first user via a video stream. For example, the first user may be searching for a file or browsing the web. In particular, techniques described herein support redirecting the gaze from an arbitrary direction to the center regardless of the relative camera and display positions. The bidirectionally trained CNN learns to redirect an arbitrary gaze to the center without requiring additional information such as a redirection angle. Moreover, the techniques may provide real-time gaze correction capability. Thus, the techniques described herein may improve the quality of video conferencing experience. In some examples, the techniques can also enable prediction of input gaze direction and magnitude at no additional cost of processing. Moreover, the techniques may be used in a live application that runs in real-time on CPU, making the techniques a feasible solution for a wide range of devices. In some examples, the predicted input gaze can be used to save power by dimming a screen of a computing device in response to detecting that the predicted input gaze is outside a particular boundary.

Figure 2:
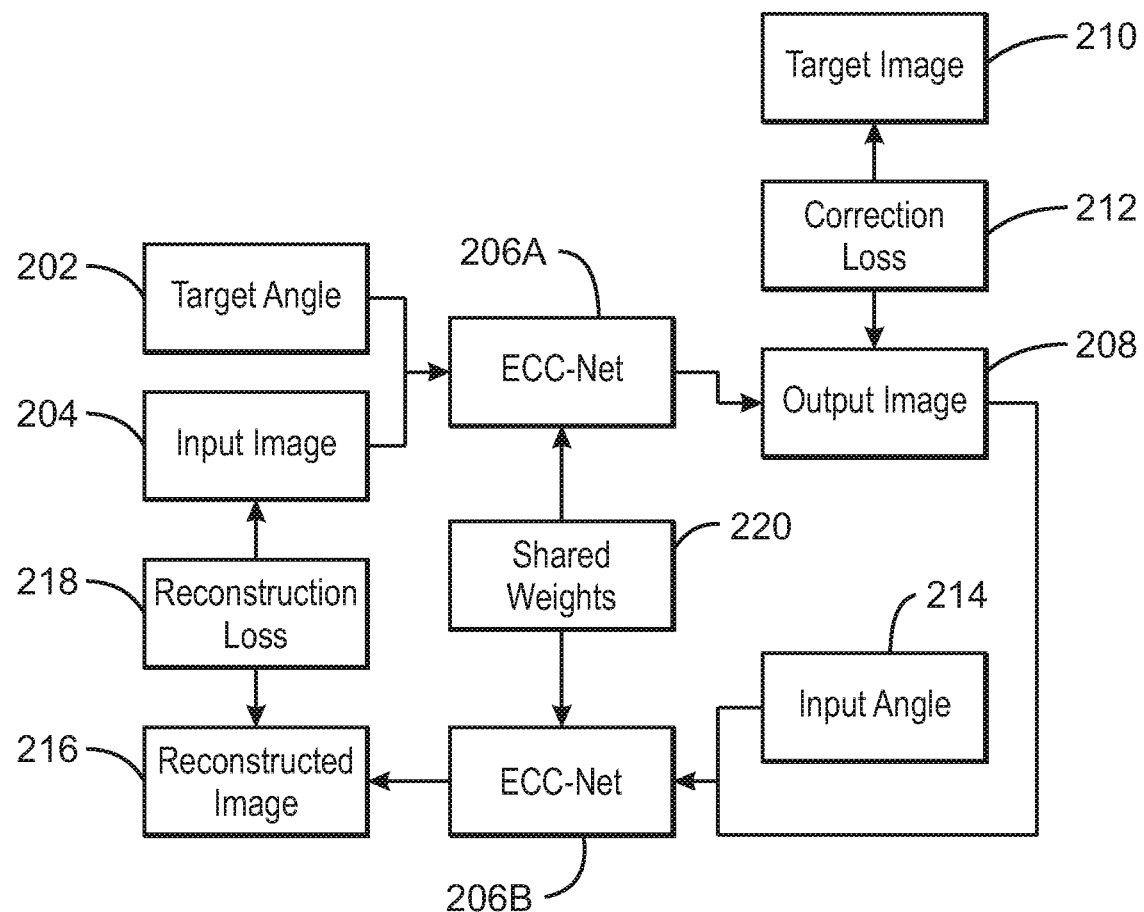
FIG. 2 is a schematic diagram illustrating an example process for bidirectionally training a model to generate gaze corrected images.
Figure 5:
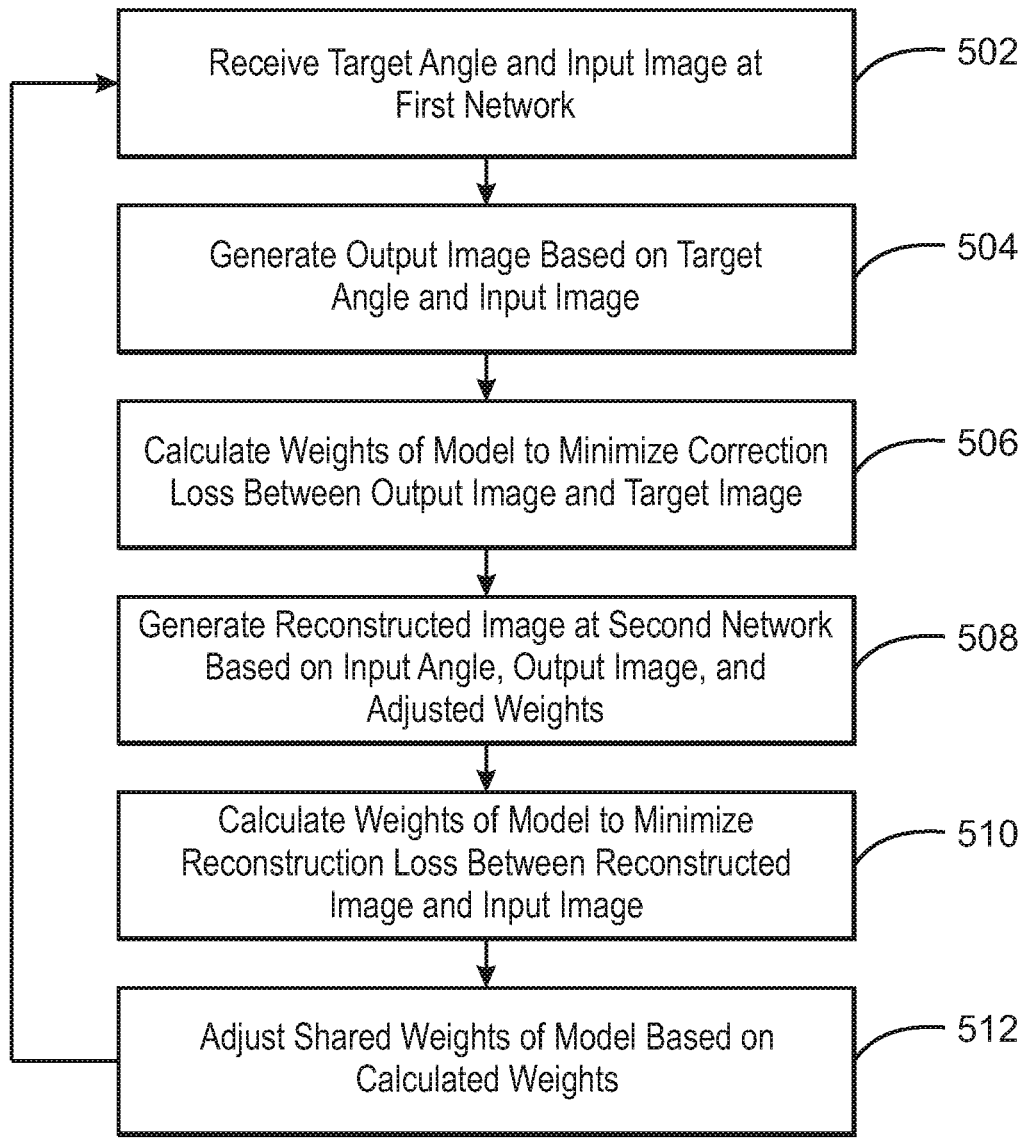
FIG. 5 is a flow chart illustrating an example method for training a network to perform image adjustment and gaze prediction.

In addition, training a model to output a vector field and brightness map, as described in FIGS. 2 and 5, has several advantages over training a generic encoder-decoder model that produces pixel-wise dense predictions. First, the vector fields produced by the model can be easily modified in a meaningful way using external signals. For example, their magnitude can be scaled before warping to control the correction strength, and they can be averaged over time for temporal smoothing. Second, predicting a motion vector imposes the prior that pixels move rather than changing in an unconstrained way when the gaze changes. Finally, training a model to output the pixel values directly may lead to outputs that lack details and are biased towards the mean image in the training set. This problem occurs when a model is trained to minimize the mean squared error between input and output pixel values.

Moreover, training the model using an adversarial loss, instead, can help generate images with high detail, since a generative adversarial network (GAN) can learn what is important to produce in the output. However, although generative adversarial networks are better at reconstructing details, the details GANs produce might originate neither in the input nor the ground truth. For example, a model that is trained with an adversarial loss can hallucinate details when the output is comprised of unrestricted pixels. This behavior may be acceptable or even preferred for many applications. However, this type of flexibility to redirect gaze may not be wanted in a video conferencing setup. For example, adding eyelashes or any other traits that are hallucinated might lead to undesired results. Therefore, the techniques described herein may include the use of a model that manipulates the location and brightness of the existing pixels. This approach ensures that any detail that is in the output originates in the input.

FIG. 1 is a block diagram illustrating an example system for generating gaze corrected images using a bidirectionally trained network. The example system is referred to generally by the reference number 100 and can be implemented in the computing device 600 in FIG. 6 using the method 300 of FIG. 3.

The example system 100 includes a received target angle 102 and input image 104. The system 100 includes a tiler 106 to tile the received target angle. The system 100 includes a concatenator 108 communicatively coupled to the tiler 106. The system 100 also includes a four pairs of convolution blocks 110 and pooling blocks 112, communicatively coupled to each other. The system 100 also includes several up-convolution blocks 114 paired with convolutional blocks 110. The system 100 includes a convolutional layer 116 coupled to two up-convolution blocks 114 and a sigmoid block 118. The sigmoid block 118 may apply a sigmoid activation function to the received input. The convolution layer 116 is shown outputting a vector field 120. The sigmoid block 118 is outputting a brightness map 122. The system 100 includes a warper 124 to receive the input image 104 and the vector field 120. The system 100 includes a local brightness adjuster 126 communicatively coupled to the warper 124. The local brightness adjuster 126 is shown outputting an output image 128. Each of the convolution blocks 108 of the system 100 includes additional blocks as indicated by dashed lines. Each convolutional block 110 includes three groups of a convolutional layer 116 coupled to a batch normalizer 130 and a rectified linear unit (ReLU) activation 132. Each convolutional block 110 also includes a residual connection 134 communicatively coupled to the three groups of convolutional layer 116 coupled to a batch normalizer 130 and a ReLU activation 132. The convolutional blocks 108 with pooling blocks 110 and up-convolution blocks 112 may be collectively referred to herein as a neural network, or convolutional neural network.

As shown in FIG. 1, the system 100, also referred to herein generally as an Eye Contact Correction (ECC)-Net, receives an input image 104 that may be an image patch that contains a single eye and a target angle 102 that may be a target gaze vector. In various examples, the image patches are resized to 64×32 before they are fed into the model. In some examples, the target angle 102 may be a target gaze vector represented in the Cartesian domain with its horizontal and vertical components. The tiler 106 may tile the target angle 102 to have the same spatial dimensions as the input image. Once the training is complete, the target angle 102 may be set to zeros to redirect the gaze to center. For example, the center may be a center of the image patches and may correspond to an eye appearing to be looking directly into the center of a camera lens. The concatenator 108 may concatenate the tiled target angles 102 and the input image. For example, the tiled target angles of size 64×32×2 may be concatenated with the input image 104 with three color channels having a size of 64×32×3 to produce an input of dimensions 64×32×5 to be sent to the first convolution block 110 and first pooling block 112.

The core of ECC-Net system 100 is a fully-convolutional encoder-decoder network which uses U-Net style skip connections and channel-wise concatenations to recover details lost at the pooling layers 112. The network is also referred to herein as a model. In various examples, the model does the bulk of processing in low resolution both to reduce the computational cost and to improve spatial coherence of the results. In the example of FIG. 1, the convolutional blocks 110 of the model include three depthwise-separable convolutional layers 116 with a residual connection that skips over the middle layer, as shown by an arrow. The convolutional layers 116 of FIG. 1 also use batch normalization 130 and ReLU activations 132.

In the example of FIG. 1, the first convolution block 110 and first pooling block 112 generates an output having dimensions 32×16×32 to the second convolution block 110 and second pooling block 112. The second convolution block 110 and second pooling block 112 generates an output having dimensions 16×8×64 to a third convolution block 110 and third pooling block 112. The third convolution block 110 and third pooling block 112 generates an output having dimensions 8×4×128 sent to a fourth convolution block 110 and fourth pooling block 112. The fourth convolution block 110 and fourth pooling block 112 generates an output having dimensions 4×2×256 that is fed into a first up-convolution block 114 and fifth convolution block 110. The first up-convolution block 114 and fifth convolution block 110 generates an output having dimensions 8×4×128 that is fed into a second up-convolution block 114, sixth convolution block 110, and second concatenator 108. The second up-convolution block 114, sixth convolution block 110, and second concatenator 108 generate an output having dimensions 16×8×64 that is fed into a seventh convolution block 110 and third concatenator 108. The seventh convolution block 110 and third concatenator 108 generate an output having dimensions 16×8×32 that is fed into a sigmoid block 118, a convolution layer 116, and two up-convolution layers 114.

The final output layer of the model includes two up-convolution layers 114 followed by a convolutional layer 116 having a 3-channel output. The model thus produces a vector field and a brightness map. As one example, the vector field 120 may be a flow field having dimensions of 64×32×2 and the brightness map 122 may have dimensions of 64×32×1. The up-convolution layers 114 may be a 2×2 convolution with a stride of ½. Two of these channels are used directly to predict the horizontal and vertical components of a vector field that is used to warp the input image. The third channel is passed through a sigmoid function and used as a map to adjust local brightness. In some examples, the brightness map 122 may be used as a mask to improve the appearance of eye whites after warping the input images to redirect gaze. The brightness map 122 may be used to enhance eye clarity and correct the artifacts that result from horizontal warping when there are not enough white pixels to recover the eye white.

In various examples, a set of control mechanisms, or control block, (not shown) may also be included to increase temporal stability and control the correction strength smoothly can be included to ensure a natural video conferencing experience. The control block can be used to reduce correction strength by scaling the ECC-Net output when appropriate. For example, the control block can be used to disable eye contact correction smoothly when the user is too far from the center, too far away from the screen, too close to the screen, or blinking. In some examples, the correction may also be disabled when a user looks at somewhere other than the camera and display. In some examples, the control block monitors the face size, distance from the center, head pose, eye opening ratio, and mean and maximum motion vector magnitudes to decide on the overall correction strength. The head pose can include monitoring pitch, roll, and yaw. In various examples, these measurements may be inferred from the output of the same facial landmark detector that is used to align and crop the eyes. In addition to the facial landmarks, the control block may also factor in mean and maximum motion vector magnitudes to limit correction for extreme gazes. In some examples, both landmark and motion vector based signals produce a scaling factor between 0 and 1. In some examples, an overall correction strength is calculated by multiplying weights calculated for each triggering signal.

In various examples, the set of control mechanisms may include a temporal stability block (not shown) may be included to apply a temporal filter to the output. For example, the stability block filters the motion vectors that are used to warp the input images temporally using an alpha-beta filter. An alpha-beta filter, as used herein, is a filter that is related to the Kalman filter. This process eliminates flicker and outlier motion vectors in an input video stream. When used together with the control block, the temporal stability block ensures the eye contact correction operates smoothly in a video conferencing setting.

Overall, the set of control mechanisms may prevent abrupt changes and ensure that the eye contact corrector avoids doing any correction when the user diverts away from a typical video conferencing use case. Consequently, the eye contact corrector may operate more smoothly and avoid awkward or unneeded corrections.

The diagram of FIG. 1 is not intended to indicate that the example system 100 is to include all of the components shown in FIG. 1. Rather, the example system 100 can be implemented using fewer or additional components not illustrated in FIG. 1 (e.g., additional target angles, input images, output images, vector fields, brightness maps, convolutional blocks, convolutional layers, dimensions, etc.).

FIG. 2 is a schematic diagram illustrating an example process for bidirectionally training a model to generate gaze corrected images. The process is 200 can be implemented in the remote device 638 below. For example, the process 200 can be implemented using the method 500 of FIG. 5, or the trainer module 706 of the computer readable media 700 of FIG. 7.

FIG. 2 shows a target angle 202 and input image 204 being received at an ECC-Net 206A. For example, the ECC-Net 206A and 206B may be any convolutional neural network (CNN), such as the network described in FIG. 1. In some examples, the ECC-Net 206A and 206B are deep neural networks. The ECC-Net 206A is outputting an output image 208 that is used to compare against a target image 210 to calculate a correction loss 212. The output image and an input angle 214 is input into the ECC-Net 206B. The ECC-Net 206B outputs a reconstructed image 216. A reconstruction loss is calculated based on the reconstructed image 216 and the input image 204. A set of shared weights 220 are shared between the ECC-Net 206A and the ECC-Net 206B. For example, the shared weights 220 can be updated every cycle based on the correction loss 212 and the reconstruction loss 218.

As shown in FIG. 2, the ECC-Net 206A and ECC-Net 206B are trained in a bi-directional fashion to enforce mapping reversibility. Bidirectional training proved to be valuable and improved the results visually. The model is first given an input image and a target angle to redirect the gaze at ECC-Net 206A. In this direction, the model is expected to minimize the correction loss. For example, the correction loss can be the mean squared error between the gaze-corrected image and the ground truth. In the other direction, the model is given the gaze-corrected output image and the input angle at ECC-Net 206B to redirect the gaze back to its original state. In various examples, warping artifacts in the output may make it difficult to recover the original image. To address this problem a reconstruction loss 218 between the reconstructed image 216 and the original input image 204 is optimized concurrently with the correction loss 212.

Training the model in a cycle-consistent way reduces the artifacts and resulted in more natural gaze redirection results. However, training giving the correction loss 212 and reconstruction loss 216 the same weight during training may lead to a mode collapse where the model quickly converges to an identity transform to minimize the reconstruction loss. Therefore, in some examples, the weight of the reconstruction loss is lowered to help the optimizer keep a good balance between the loss functions in both directions. As one example, readjusting the weights of the losses in the total loss function as $L_{total}=0:8L_c+0:2L_r$ can help the optimizer keep a good balance between the loss functions in both directions.

The target angles 202 are used during training and may be set to zeroes (0,0) during inference since the goal of the model is to redirect the gaze to the center to correct the eye contact. Target direction invariant training may be used to improve the robustness of the model and allowed for post-training calibration. For example, if the gaze is still off after correction on a particular device then the target angle 202 can be tuned to compensate for the offset. Using pairs of input images 204 having arbitrary gazes also increased the number of possible image pairs. For example, $$\binom{40}{2} = 780$$

using a set of 40 images for a given subject, unique pairs can be generated as compared to 39 pairs using a single target. This approach can be used to effectively augment the data and reduce the risk of overfitting.

In some examples, the model is trained on both left and right eyes, where left eyes on the synthetic dataset were generated by flipping right eyes. However, this may result in a poor horizontal correction since the model may allocate consideration resources to decide whether the input is a left or right eye to be able to correct the gaze horizontally in the right amount. In some examples, to better utilize the model capacity for correction, the model is trained on right eyes only and flipped left eyes during inference. In this manner, the model can learn to correct the gaze better both horizontally and vertically.

As one example, to train and validate the system, two different datasets are prepared: one synthetic dataset and one natural dataset. The synthetic dataset includes of image sets within which all factors of variation except for gaze stays constant. Similarly, the natural dataset includes image pairs where a subject looks into a random point on display and then into the camera in each pair. The ECC-Nets 206A and 206B are trained using only the synthetic dataset and the natural dataset may be used as a validation set to pick the best performing model configuration. The use of a synthetic data set may avoid privacy and legal issues and may be a significant part of the dataset used.

In this example, realistic images of eyes looking into different directions are programmatically generated. For example, a synthetic data generator can use the UnityEyes platform, first released by Wood et al. in 2016, to render and rasterize images of eyes, which are later refined by a generative adversarial network. In some examples, the sets of eye images can be created by programmatically moving the cursor to move the gaze towards random directions. For example, the cursor movements can be modeled as a zero mean Gaussian random variable, where zero means a centered gaze, looking right into the camera. To increase the diversity of samples in the dataset, the subject traits, lighting, and head pose are randomized between different sets of images. Randomizing the subject traits changes the color, shape, and texture of the face, skin, and eyes. Using this process, 3200 artificial subjects with random traits are generated, resulting in 128,000 images and nearly 2.5 million image pairs.

In various examples, the range of movement in the head pose randomization is limited since eye contact correction may not be enabled if the user is clearly looking at somewhere other than the camera and display. Therefore, the head pose may be kept within the limits of a typical use case, where the eye contact correction would be practical to use.

In some examples, to further increase randomness, the render quality of the synthetic images is randomized. For example, the use of a higher render quality may be suitable for many applications. However, the amount of detail in images rendered at a highest quality, such as the reflection of the outside world on the surface of the eyes, may be unrealistic depending on the type of camera used in a given use case.

After raster images are captured from the UnityEyes platform, glasses of different sizes and shapes may be superimposed on some of the image sets to further increase dataset diversity. In some examples, glasses of different sizes and shapes are superimposed on some of the image sets. For example, glasses can be generated using 25 different designs as templates, where size, color, and relative position are randomized within a visually realistic range. Once the glasses are superimposed, the eyes may be aligned and cropped. For example, the facial landmarks provided by the UnityEyes platform can be used to align and crop the eyes. These landmarks may be comparable to the ones used for natural images. Since the images are generated synthetically, they can be accurately aligned before the eyes are cropped. However, just using a bounding box that encloses the eye landmarks to crop each image may lead to small offsets between the images in the same set due to landmarks shifted by the gaze. Thus, in some examples, a bounding box is created that fits all images in a given set and a single bounding box may be used per set. In various examples, the bounding boxes have a fixed aspect ratio of 2:1 and are padded to have twice as much width as the average width in a given set.

In various examples, all of the processing steps until after cropping discussed above may be performed only once as a pre-processing step. In some examples, image pairs are distorted on the fly during training with additive noise, brightness and contrast shift, and Gaussian blur, in random order and magnitude. These distortions not only emulate imperfect imaging conditions but also further augment the diversity of the samples in the dataset.

In some examples, to enhance photorealism, a generative adversarial network can be used. For example, the generative adversarial network can learn a mapping between synthetic and real samples and bring the distribution of the synthetically generated data closer to the ones captured by cameras. Using the trained generative adversarial network, all images in the synthetic dataset can be refined to create a large dataset that consists of photorealistic images having virtually perfect labels.

In various examples, a natural dataset can be collected that includes image pairs where the participants moved their gaze between the camera and random points on display. The gaze of the participants is guided by displaying dots on the screen. In various examples, the subjects may participate in the data collection at their convenience without being invited into a controlled environment, using a laptop or tablet as the data collection device. Therefore, the data collected may be representative of the typical use cases of the proposed application.

To improve the data quality, a routine that automatically deletes the frames that were likely to be erroneous may be used. First, the cleaning routine removes the first frames in each sequence to compensate for the lagged response from the subjects. Second, the routine removes the frames where no faces are detected. Finally, the routine removes the frames where the subject is blinking, where the blinks are inferred from the distances between eye landmarks. These cleaning steps may lead to some incomplete image pairs, where either the input or ground truth image are removed completely. Incomplete image pairs may be removed to make sure that all pairs in the dataset are complete. As one example, the clean dataset may include 3,125 gaze pair sequences collected from over 200 participants.

In various examples, the natural dataset can be used both to evaluate the model and to make the synthetic dataset more photorealistic. For example, a generative adversarial network can be used to convert synthetic images into natural looking ones. Being able to generate a photorealistic synthetic dataset allows for generating immense amount of data with pixel-perfect labels with a minimal cost.

As one example, ECC-Net is trained using only the synthetic dataset and the natural dataset used as a validation set to pick the best performing model configuration. Once the training is complete, the frozen model may be tested on the Columbia Gaze Data Set, released in 2013, which is a public benchmark dataset that was originally used for eye contact detection. Using data from entirely different sources for training, validation, and test sets minimized the risk of overfitting, including its implicit forms such as information leakage from the validation set due to excessive hyperparameter tuning or dataset bias.

In this example, relative reduction in mean squared error is used as the performance metric. The error metric is modified to be more robust against minor misalignments. This misalignment-tolerant error used the minimum of errors between image pairs shifted within a slack of 3×3 pixels. The misalignment-tolerant error may be more consistent with the visual quality of the results as compared to a rigid pixel-to-pixel squared error.

In this example, the model may be trained for about 3 million iterations, using an Adam solver with default momentum parameters of $\beta_1=0.9$, $\delta_2=0.999$, $\epsilon=0.1$, and a cyclic learning rate between 0.01 and 0.004. In some examples, the error may reach its minimum value at around 2 million iterations. In some examples, the model at this iteration may reduce the error by 63% compared to identity transform. The model also produced visually good looking results. In some examples, the overall error can be further decreased by using a portion of the natural dataset for fine-tuning and the rest for validation, although fine-tuning the entire network on natural data may lead to overfitting rapidly. In some deep learning applications, the first layers may be frozen and the last ones fine-tuned to prevent overfitting. This is because the models transfer weights from other models that used similar data to accomplish different tasks. In this case, however, the task is the same for both the natural and synthetic dataset, while the input data distribution might differ. Therefore, only the first layers are turned as a form of domain adaptation, while the rest of the network stayed frozen. Using a portion of the natural data for domain adaptation decreased the relative error by another 2%.

Although domain adaptation helps reduce the error, domain adaptation may also noticeably decrease the correction strength and worsen the qualitative results. Despite the misalignment-tolerant error metric, some of the remaining error on the natural dataset may be due to the differences other than the gaze, such as shadows and reflections. A substantial decrease in the error may be a result of better gaze correction whereas smaller 'improvements' may be a result of closer-to-average results that smoothed out other factors of variation. Therefore, the natural dataset may be used as a development set and the error calculated as a sanity check rather than as a benchmark, while continuously monitoring the results qualitatively. Overall, training the model solely on synthetic data may result in visually better results. This is likely a result of the impact of perfect labels in the synthetic set outweighing the impact of a data distribution closer to the real use case in the natural set.

In some examples, to bring the distribution of the synthetic data closer to real data without sacrificing the label quality, a generative adversarial network may be built based on CycleGAN, first released 2017. CycleGAN uses cycle-consistent training to learn a mapping between the two image sets without having a one-to-one correspondence. The generator in the trained model is used to generate a photo-realistic eye image given a synthetic sample. To further encourage similarity between the synthetic inputs and natural-looking outputs two additional mean absolute error (L1) losses defined between the inputs and outputs of the generators are used. These additional loss functions are defined only on the luminance channel to give the model more flexibility to modify color while preserving the gaze direction and the overall structure of the eye and its surroundings. The default hyperparameters for CycleGAN are used for training, treating the additional L1 losses same as the reconstruction losses.

The trained generator may produce photorealistic images without changing the gaze in the input. The results may have almost no artifacts for the typical use cases. The artifacts may be minimal even for the challenging cases such as where there is glare, glass frames are too close to the eye, or the scene is too dark or blurry.

In addition, using the above training process, the model may learn to predict the input gaze implicitly. For example, by computing the mean motion vector based on the output vector field, negating its direction, and scaling its magnitude to fit the screen, as described in FIG. 5, an estimate of the input gaze can be generated. Thus, unlike a typical multi-task learning setup where a model is trained to perform multiple tasks simultaneously, the model learns to perform two tasks while being trained to perform only one of them. In this respect, the model may not be a fully-blown gaze predictor, but rather is an eye contact corrector that can learn the input gaze to function better. This behavior may be a byproduct of training the model to redirect gaze without providing a redirection angle, in which the input gaze angle is inferred. The inferred gaze does not incorporate head pose or distance from the screen and relies only on the information extracted from eyes in isolation. Therefore, it may not be as accurate as systems that use dedicated sensors or models that are designed specifically for gaze prediction. However, the predicted gaze can still be practical to use in a variety of use cases where the computational cost is a concern, since the additional cost, i.e., mean computation and negation, is negligible. For example, a video conferencing application that uses eye contact correction would be able to compute gaze statistics with minimal overhead. Those gaze statistics may reveal information about the effectiveness of a conversation and provide feedback to users. In some examples, the real-time gaze information would also enable hands-free interactions, such as dimming the backlight when the user is not engaged. Thus, the gaze prediction property of our eye contact corrector has the potential to decrease battery consumption while providing additional functionality.

The diagram of FIG. 2 is not intended to indicate that the example process 200 is to include all of the components shown in FIG. 2. Rather, the example process 200 can be implemented using fewer or additional components not illustrated in FIG. 2 (e.g., additional input images, target angles, input angles, losses, reconstructed images, output images, target images, etc.).

Figure 3:
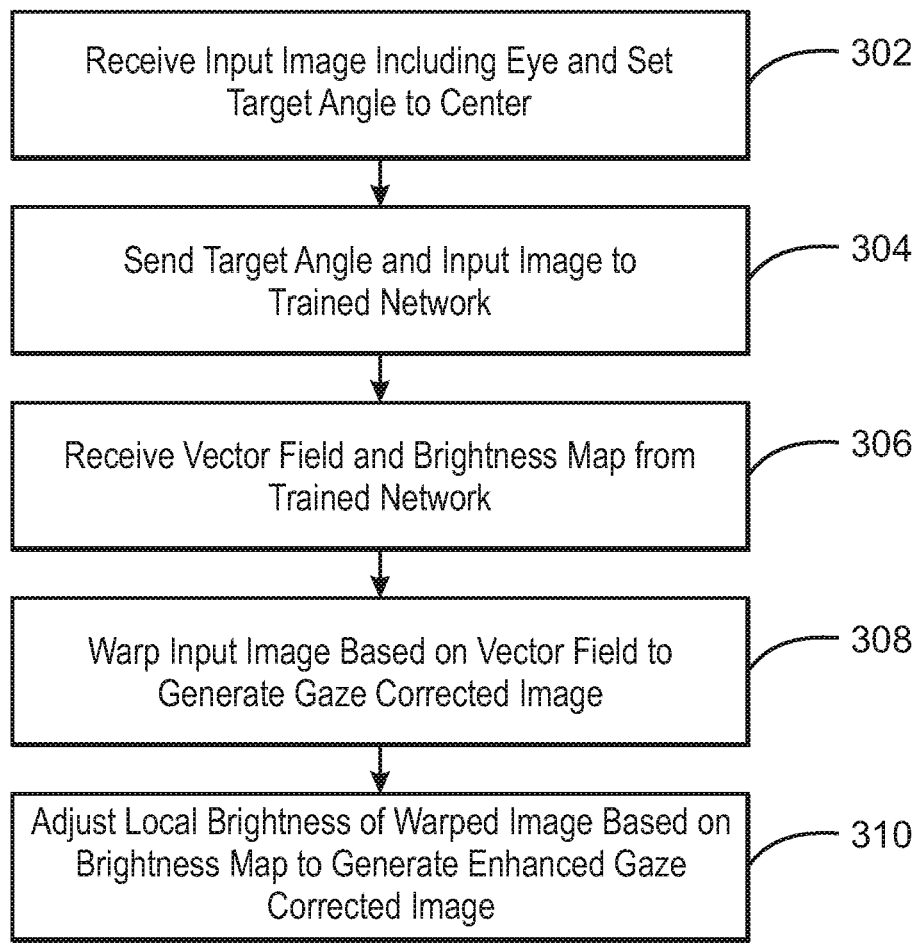
FIG. 3 is a flow chart illustrating an example method for generating gaze corrected images.

FIG. 3 is a flow chart illustrating an example method for generating gaze corrected images. The method 300 can be implemented in the system 100 of FIG. 1, the processor 602 of the computing device 600 of FIG. 6, or the computer readable media 700 of FIG. 7.

At block 302, an input image including an eye is received and a target angle is set to a center. For example, the center may be represented using the coordinates (0,0). For example, the input image may be an image patch of one eye. The center may correspond to the center of the image patch.

At block 304, the target angle and the input image are sent to a trained network. The trained network may be a bidirectionally trained convolutional neural network. For example, the trained network may be a convolutional neural network trained using the method 500.

At block 306, a vector field and brightness map are received from the trained network. For example, the vector field may include motion vectors that indicate where pixels are to be moved. The brightness map may include a brightness mask that includes a brightness multiplier for each pixel in the input image.

At block 308, the input image is warped based on the vector field to generate a gaze corrected image. In some examples, the input image may also be resized. For example, the input image may be resized to a predetermined size. As one examples, the predetermined size may be 64×32 pixels.

At block 310, a local brightness of warped image is adjusted based on brightness map to generate an enhanced gaze corrected image. For example, the brightness map 122 may be used as a mask to improve the appearance of eye whites after warping the input images to redirect gaze.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation. For example, the method 300 may include receiving a predicted input gaze direction and magnitude from the trained network and dimming the backlight of a screen of a device in response to detecting that a user is not engaged based on the predicted input gaze direction and magnitude. For example, the predicted input gaze and magnitude of the user may be outside a predetermined threshold range. The method 300 may also include receiving a predicted input gaze direction and magnitude from the trained network and using the predicted input gaze direction and magnitude as input to control an application. For example, the predicted input gaze direction may be used instead of, or in addition to, other user input, such as keyboard or mouse inputs, among other inputs.

Figure 4:
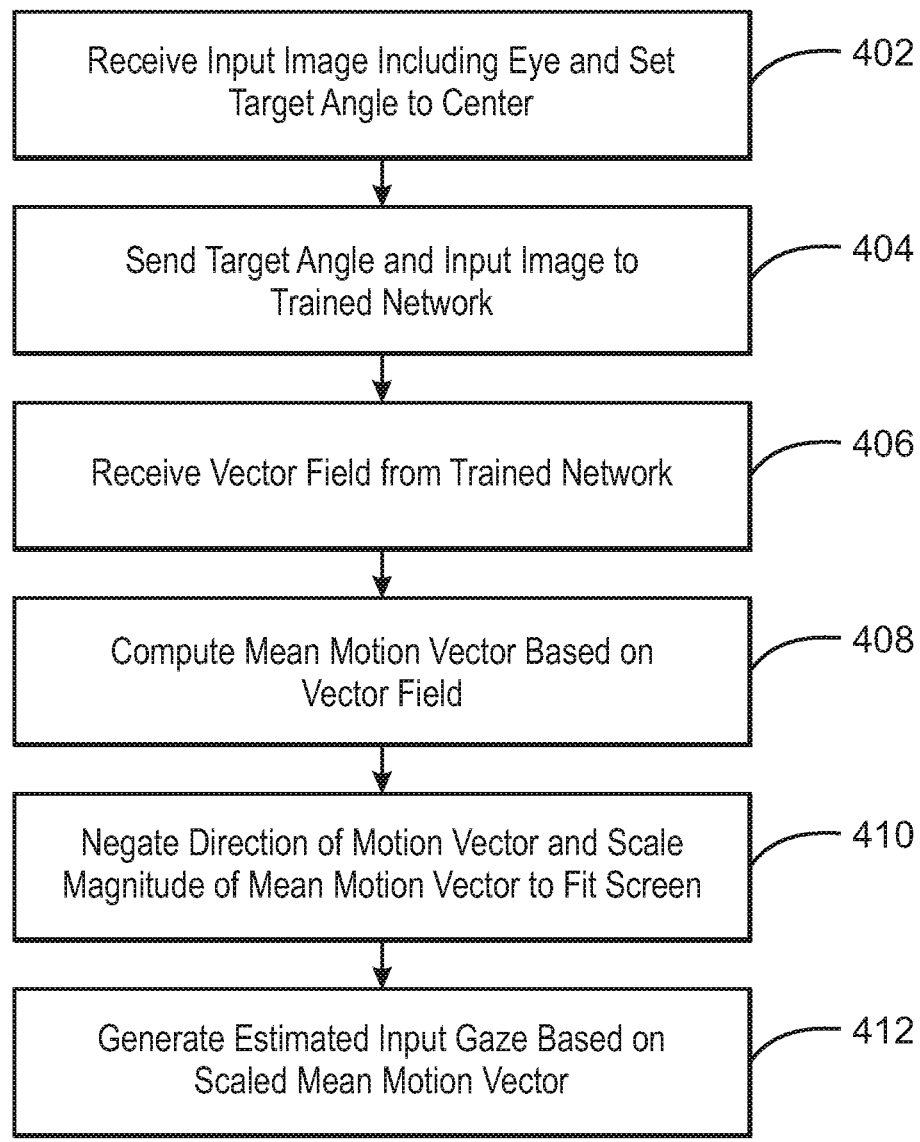
FIG. 4 is a flow chart illustrating an example method for predicting input gaze using a bidirectionally trained network.

FIG. 4 is a flow chart illustrating an example method for predicting input gaze using a bidirectionally trained network. The method 400 can be implemented in the system 100 of FIG. 1, the processor 602 and gaze predictor 636 of the computing device 600 of FIG. 6, or the gaze predictor module 714 of the computer readable media 700 of FIG. 7.

At block 402, an input image including an eye is received and a target angle is set to center. For example, the center may be indicated by the coordinates (0,0). The center may correspond to the center of an image patch of the eye.

At block 404, the target angle and the input image are sent to a trained network. For example, the trained network may be a bidirectionally trained convolutional neural network. As one examples, the network may be bidirectionally trained to generate vector fields and brightness maps based on simulated input images, as described in FIG. 5.

At block 406, a vector field is received from the trained network. For example, the vector field may include motion vectors that indicate where pixels are to be moved.

At block 408, a mean motion vector is computed based on the vector field. For example, the mean motion vector may be computed by averaging the motion vectors of the vector field.

At block 410, a direction of the motion vector is negated and a magnitude of the mean motion vector is scaled to fit a screen. For example, the screen may be the screen of the computing device that is capturing video frames. The computing device may be a laptop, tablet, or any video conferencing capable device.

At block 412, an estimated input gaze is generated based on the scaled mean motion vector. For example, the estimated input gaze may approximate a gaze of a user's eyes captured in the input image.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

FIG. 5 is a flow chart illustrating an example method for training a network to perform image adjustment and gaze prediction. The method 500 can be implemented in the remote device 638 of FIG. 6, or the computer readable media 700 of FIG. 7, and can be used to train the system 100 of FIG. 1 or the bidirectionally trained CNN 632 of FIG. 6. The method 500 can be used to implement the process 200 of FIG. 2 above.

At block 502, a target angle and input image is received at a first network. For example, the network may be an artificial neural network, such as a convolutional neural network. In various examples, the input image may be one of any number of simulated images generated based on a sample input image. In some examples, the simulated images may be from a synthetic data set that includes superimposed glasses of different sizes and shapes. For example, the glasses may have been superimposed on some images in the simulated images to increase dataset diversity.

At block 504, an output image is generated based on the target angle and the input image. For example, the target angle may be set to a center, which may be represented by the coordinates (0,0).

At block 506, weights of a model are calculated to minimize correction loss between the output image and the target image. For example, the weights may be parameters of the model that may be modified to change the output of one or more layers of the model.

At block 508, a reconstructed image is generated at a second network based on the input angle, the output image, and the adjusted weights. For example, the second network may be based on the model used for the first network, but having the weights calculated at block 506.

At block 510, weights of model are calculated to minimize a reconstruction loss between the reconstructed image and the input image. For example, the reconstruction loss may be the difference of the values of the pixels between the reconstructed image and the input image.

At block 512, shared weights of the model are adjusted based on the calculated weights. For example, the weights of the model calculated at block 506 may be adjusted based on the weights calculated at block 510. The model to be used for a trained network may thus be trained bidirectionally.

This process flow diagram is not intended to indicate that the blocks of the example method 500 are to be executed in any particular order, or that all of the blocks are to be included in every case. Further, any number of additional blocks not shown may be included within the example method 500, depending on the details of the specific implementation. For example, additional iterations of bidirectional training via blocks 502-512 may be performed until a predetermined number of iterations are detected or a convergence of parameter values is detected. For example, a convergence of parameter values may be detected when the change in parameters is detected to be below a threshold difference in values.

Figure 6:
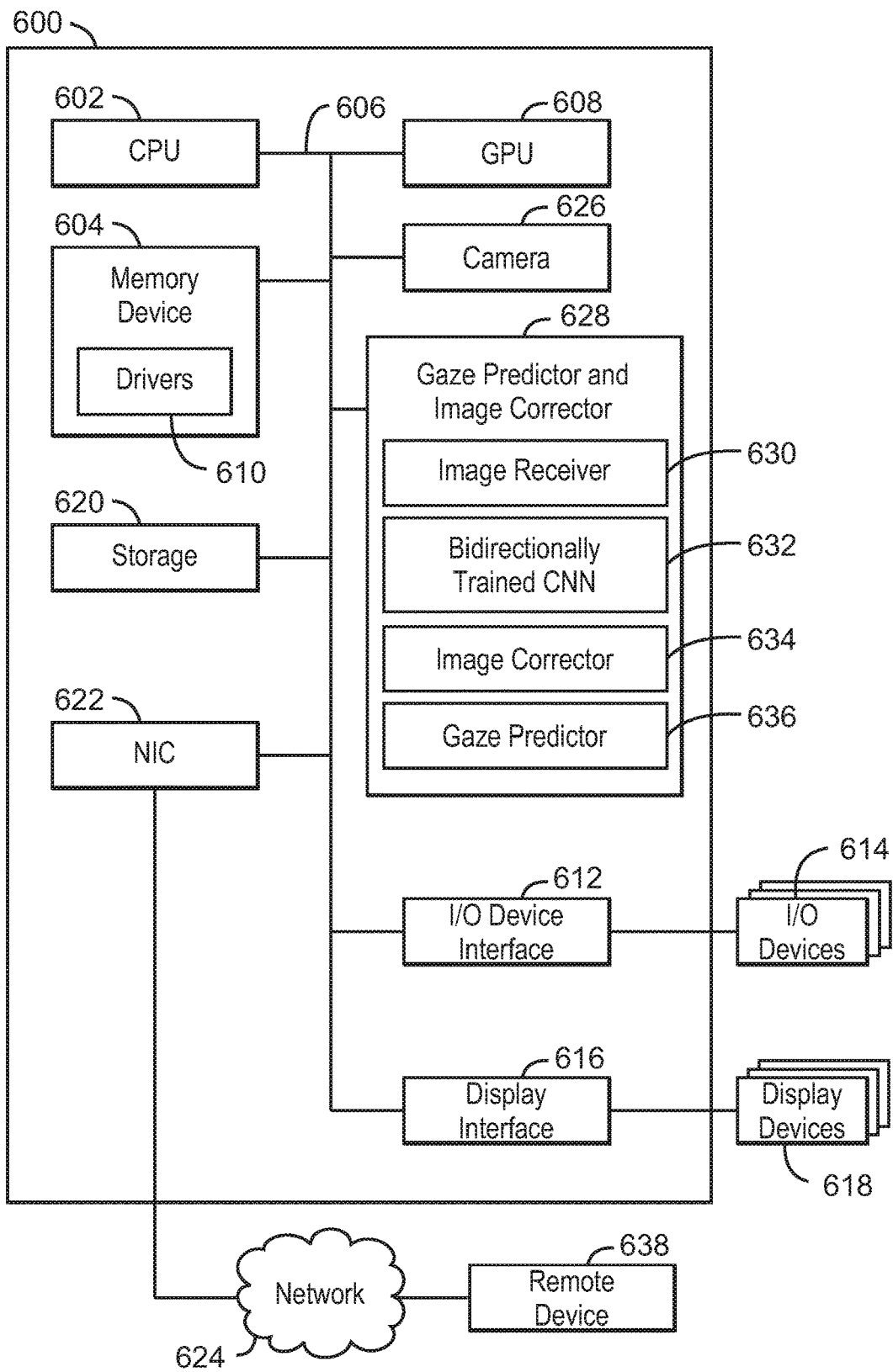
FIG. 6 is block diagram illustrating an example computing device that can perform image adjustment and gaze prediction.

Referring now to FIG. 6, a block diagram is shown illustrating an example computing device that can perform image adjustment and gaze prediction. The computing device 600 may be, for example, a laptop computer, desktop computer, server, tablet computer, mobile device, or wearable device, among others. In some examples, the computing device 600 may be a smart watch. The computing device 600 may include a central processing unit (CPU) 602 that is configured to execute stored instructions, as well as a memory device 604 that stores instructions that are executable by the CPU 602. The CPU 602 may be coupled to the memory device 604 by a bus 606. Additionally, the CPU 602 can be a single core processor, a multi-core processor, a computing cluster, or any number of other configurations. Furthermore, the computing device 600 may include more than one CPU 602. In some examples, the CPU 602 may be a system-on-chip (SoC) with a multi-core processor architecture. In some examples, the CPU 602 can be a specialized digital signal processor (DSP) used for image processing. The memory device 604 can include random access memory (RAM), read only memory (ROM), flash memory, or any other suitable memory systems. For example, the memory device 604 may include dynamic random access memory (DRAM).

The memory device 604 can include random access memory (RAM), read only memory (ROM), flash memory, or any other suitable memory systems. For example, the memory device 604 may include dynamic random access memory (DRAM).

The computing device 600 may also include a graphics processing unit (GPU) 608. As shown, the CPU 602 may be coupled through the bus 606 to the GPU 608. The GPU 608 may be configured to perform any number of graphics operations within the computing device 600. For example, the GPU 608 may be configured to render or manipulate graphics images, graphics frames, videos, or the like, to be displayed to a user of the computing device 600.

The memory device 604 can include random access memory (RAM), read only memory (ROM), flash memory, or any other suitable memory systems. For example, the memory device 604 may include dynamic random access memory (DRAM). The memory device 604 may include device drivers 610 that are configured to execute the instructions for generating gaze corrected images and predicting input gaze. The device drivers 610 may be software, an application program, application code, or the like.

The CPU 602 may also be connected through the bus 606 to an input/output (I/O) device interface 612 configured to connect the computing device 600 to one or more I/O devices 614. The I/O devices 614 may include, for example, a keyboard and a pointing device, wherein the pointing device may include a touchpad or a touchscreen, among others. The I/O devices 614 may be built-in components of the computing device 600, or may be devices that are externally connected to the computing device 600. In some examples, the memory 604 may be communicatively coupled to I/O devices 614 through direct memory access (DMA).

The CPU 602 may also be linked through the bus 606 to a display interface 616 configured to connect the computing device 600 to a display device 618. The display device 618 may include a display screen that is a built-in component of the computing device 600. The display device 618 may also include a computer monitor, television, or projector, among others, that is internal to or externally connected to the computing device 600.

The computing device 600 also includes a storage device 620. The storage device 620 is a physical memory such as a hard drive, an optical drive, a thumbdrive, an array of drives, a solid-state drive, or any combination thereof. The storage device 620 may also include remote storage drives.

The computing device 600 may also include a network interface controller (NIC) 622. The NIC 622 may be configured to connect the computing device 600 through the bus 606 to a network 624. The network 624 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 600 further includes a camera 626. For example, the camera 626 may include one or more image sensors. In some examples, the camera 626 may include a processor to generate image patches of eyes.

The computing device 600 further includes a gaze predictor and corrector 628. For example, the gaze predictor and image corrector 628 can be used to predict input gaze and correct input images of eyes. The gaze predictor and image corrector 628 can include an image receiver 630, a bidirectionally trained convolutional neural network (CNN) 632, an image corrector 634, and a gaze predictor 636. In some examples, each of the components 630-636 of the gaze predictor and image corrector 628 may be a microcontroller, embedded processor, or software module. The image receiver 630 can receive an image comprising an eye and a target angle set to a center and send the image. The bidirectionally trained CNN 632 can receive the image and the target angle from the image receiver 630 and generate a vector field and a brightness map based on the image and the target angle. In some examples, bidirectionally trained CNN 632 is trained based on a synthetic data set comprising glasses of different sizes and shapes superimposed on some image sets to increase dataset diversity. The image corrector 634 can generate a gaze corrected image based on the vector field and the brightness map. For example, the image corrector 634 can warp the input image based on the vector field to generate a gaze corrected image. The image corrector 634 can also adjust a local brightness of the warped image based on the brightness map to generate an enhanced gaze corrected image. The gaze predictor 636 can predict a gaze direction and a magnitude based on the vector field. For example, the gaze predictor 636 can compute a mean motion vector based on the vector field. In some examples, the gaze predictor 636 can negate a direction of motion vector and a scale a magnitude of mean motion vector to fit a screen. The gaze predictor 636 can then generate an estimated input gaze based on the scaled mean motion vector.

The computing device 600 may be coupled to a remote device 638 via the network 624. The remote device 638 may be used to train the bidirectionally trained CNN 632. For example, the remote device 638 may remotely train a CNN and provide the bidirectionally trained CNN 632 to the computing device 600.

The block diagram of FIG. 6 is not intended to indicate that the computing device 600 is to include all of the components shown in FIG. 6. Rather, the computing device 600 can include fewer or additional components not illustrated in FIG. 6, such as additional buffers, additional processors, and the like. The computing device 600 may include any number of additional components not shown in FIG. 6, depending on the details of the specific implementation. For example, the computing device 600 may also include a power saving module to save power by dimming a screen in response to detecting that a user is looking away from the screen. In some examples, the computing device 600 may also include a visual controller to control a computing device using gaze information including gaze direction and magnitude. In various examples, the computing device 600 may also include a temporal filter to temporally filter the motion vectors in the vector field that are used to warp the input images.

Furthermore, any of the functionalities of the image receiver 630, the bidirectionally trained CNN 632, the image corrector 634, and the gaze predictor 636, may be partially, or entirely, implemented in hardware and/or in the processor 602. For example, the functionality may be implemented with an application specific integrated circuit, in logic implemented in the processor 602, or in any other device. In addition, any of the functionalities of the CPU 602 may be partially, or entirely, implemented in hardware and/or in a processor. For example, the functionality of the gaze predictor and image corrector 628 may be implemented with an application specific integrated circuit, in logic implemented in a processor, in logic implemented in a specialized graphics processing unit such as the GPU 608, or in any other device.

Figure 7:
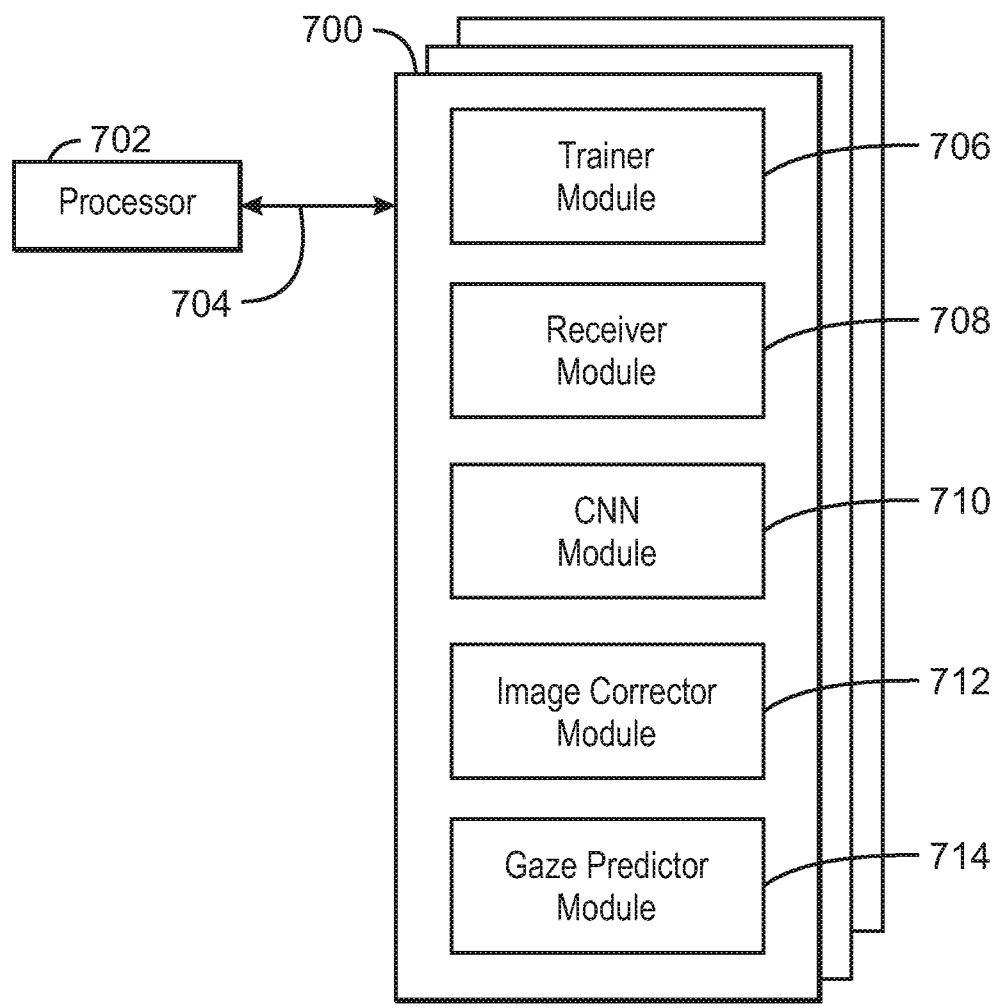
FIG. 7 is a block diagram showing computer readable media that store code for training a network to perform image adjustment and gaze prediction.

FIG. 7 is a block diagram showing computer readable media 700 that store code for training a network to perform image adjustment and gaze prediction. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media.

The various software components discussed herein may be stored on one or more computer readable media 700, as indicated in FIG. 7. For example, a trainer module 706 may be configured to bidirectionally train a network to generate vector fields and brightness maps. For example, the trainer module 706 may be configured to bidirectionally train the network to generate vector fields and brightness maps based on simulated input images. For example, the simulated images simulated input images may include superimposed glasses of different sizes and shapes. As one example, the trainer module 706 may be configured to perform the method 500 of FIG. 5. A receiver module 708 may be configured to receive an image comprising an eye and a target angle set to a center and send the image to a trained network. A CNN module 710 may be configured to generate a vector field and a brightness map based on the image and the target angle. An image corrector module 712 is configured to generate a gaze corrected image based on the vector field and the brightness map. For example, the image corrector module 712 may be configured to warp the input image based on the vector field to generate the gaze corrected image. In some examples, the image corrector module 712 may be configured to resize the input image to a predetermined size. For example, the image corrector module 712 may be configured to adjust a local brightness of the warped image based on the brightness map to generate an enhanced gaze corrected image. A gaze predictor module 714 may be configured to predict a gaze direction and magnitude based on the vector field. For example, the gaze predictor module 714 may be configured to compute a mean motion vector based on vector field. The gaze predictor module 714 may be configured to negate a direction of motion vector and a scale a magnitude of mean motion vector to fit a screen. The gaze predictor module 714 may be configured to generate an estimated input gaze based on the scaled mean motion vector.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation. For example, the computer readable media 700 can also include a power saving module to save power by dimming a screen while a user is looking away. In some examples, the computer readable media 700 can also include a visual controller to control a computing device using gaze information including gaze direction and magnitude.

EXAMPLES

Example 1 is an apparatus for correcting gaze in images. The apparatus includes an image receiver to receive an image including an eye and a target angle set to a center. The apparatus also includes a bidirectionally trained convolutional neural network (CNN) to receive the image and the target angle from the image receiver and generate a vector field and a brightness map based on the image and the target angle. The apparatus further includes an image corrector to generate a gaze corrected image based on the vector field and the brightness map.

Example 2 includes the apparatus of example 1, including or excluding optional features. In this example, the image corrector is to warp the input image based on the vector field to generate the gaze corrected image.

Example 3 includes the apparatus of any one of examples 1 to 2, including or excluding optional features. In this example, the image corrector is to adjust a local brightness of the warped image based on the brightness map to generate an enhanced gaze corrected image.

Example 4 includes the apparatus of any one of examples 1 to 3, including or excluding optional features. In this example, the apparatus includes a gaze predictor to predict a gaze direction and a magnitude based on the vector field.

Example 5 includes the apparatus of any one of examples 1 to 4, including or excluding optional features. In this example, the apparatus includes a gaze predictor to compute a mean motion vector based on the vector field.

Example 6 includes the apparatus of any one of examples 1 to 5, including or excluding optional features. In this example, the apparatus includes a gaze predictor to negate a direction of motion vector and a scale a magnitude of mean motion vector to fit a screen of the apparatus.

Example 7 includes the apparatus of any one of examples 1 to 6, including or excluding optional features. In this example, the apparatus includes a gaze predictor to generate an estimated input gaze based on a scaled mean motion vector.

Example 8 includes the apparatus of any one of examples 1 to 7, including or excluding optional features. In this example, the apparatus includes a temporal filter to temporally filter the motion vectors in the vector field that are used to warp the input images.

Example 9 includes the apparatus of any one of examples 1 to 8, including or excluding optional features. In this example, the apparatus includes a power saving module to save power by dimming a screen in response to detecting that a user is looking away from the screen.

Example 10 includes the apparatus of any one of examples 1 to 9, including or excluding optional features. In this example, the bidirectionally trained CNN is trained based on a synthetic data set including glasses of different sizes and shapes superimposed on some image sets to increase dataset diversity.

Example 11 is a method for correcting gaze in images. The method includes receiving, via a processor, an image including an eye and a target angle set to a center. The method also includes sending, via the processor, the target angle and the input image to a trained network. The method further includes receiving, via the processor, a vector field and a brightness map from the trained network. The method also further includes warping, via the processor, the input image based on vector field to generate a gaze corrected image.

Example 12 includes the method of example 11, including or excluding optional features. In this example, the method includes bidirectionally training the network to generate vector fields and brightness maps based on simulated input images.

Example 13 includes the method of any one of examples 11 to 12, including or excluding optional features. In this example, the method includes bidirectionally training the network based on simulated input images including superimposed glasses of different sizes and shapes.

Example 14 includes the method of any one of examples 11 to 13, including or excluding optional features. In this example, the method includes method of claim 11, adjusting, via the processor, a local brightness of warped image based on brightness map to generate an enhanced gaze corrected image.

Example 15 includes the method of any one of examples 11 to 14, including or excluding optional features. In this example, the method includes predicting a gaze direction and magnitude based on the vector field.

Example 16 includes the method of any one of examples 11 to 15, including or excluding optional features. In this example, the method includes computing a mean motion vector based on the vector field, negating a direction of motion vector, and scaling a magnitude of mean motion vector to fit a screen, and generating an estimated input gaze based on the scaled mean motion vector.

Example 17 includes the method of any one of examples 11 to 16, including or excluding optional features. In this example, warping the input image further includes resizing the input image to a predetermined size.

Example 18 includes the method of any one of examples 11 to 17, including or excluding optional features. In this example, the method includes applying a temporal filter to temporally filter the motion vectors in the vector field that are used to warp the input images.

Example 19 includes the method of any one of examples 11 to 18, including or excluding optional features. In this example, the method includes receiving a predicted input gaze direction and magnitude from the trained network and dimming the backlight of a screen of a device in response to detecting that a user is not engaged based on the predicted input gaze direction and magnitude.

Example 20 includes the method of any one of examples 11 to 19, including or excluding optional features. In this example, the method includes receiving a predicted input gaze direction and magnitude from the trained network and using the predicted input gaze direction and magnitude as input to control an application.

Example 21 is at least one computer readable medium for correcting gaze in images having instructions stored therein that direct the processor to receive an image including an eye and a target angle set to a center. The computer-readable medium also includes instructions that direct the processor to generate a vector field and a brightness map based on the image and the target angle. The computer-readable medium further includes instructions that direct the processor to generate a gaze corrected image based on the vector field and the brightness map.

Example 22 includes the computer-readable medium of example 21, including or excluding optional features. In this example, the computer-readable medium includes instructions to bidirectionally train the network to generate vector fields and brightness maps based on simulated input images.

Example 23 includes the computer-readable medium of any one of examples 21 to 22, including or excluding optional features. In this example, the computer-readable medium includes instructions to warp the input image based on the vector field to generate the gaze corrected image.

Example 24 includes the computer-readable medium of any one of examples 21 to 23, including or excluding optional features. In this example, the computer-readable medium includes instructions to adjust a local brightness of the warped image based on the brightness map to generate an enhanced gaze corrected image.

Example 25 includes the computer-readable medium of any one of examples 21 to 24, including or excluding optional features. In this example, the computer-readable medium includes instructions to predict a gaze direction and magnitude based on the vector field.

Example 26 includes the computer-readable medium of any one of examples 21 to 25, including or excluding optional features. In this example, the computer-readable medium includes instructions to compute a mean motion vector based on the vector field, negate a direction of motion vector, scale a magnitude of mean motion vector to fit a screen, and generate an estimated input gaze based on the scaled mean motion vector.

Example 27 includes the computer-readable medium of any one of examples 21 to 26, including or excluding optional features. In this example, the computer-readable medium includes instructions to resize the input image to a predetermined size.

Example 28 includes the computer-readable medium of any one of examples 21 to 27, including or excluding optional features. In this example, the computer-readable medium includes instructions to apply a temporal filter to temporally filter the motion vectors in the vector field that are used to warp the input images.

Example 29 includes the computer-readable medium of any one of examples 21 to 28, including or excluding optional features. In this example, the computer-readable medium includes instructions to receive a predicted input gaze direction and magnitude from the trained network and dim a backlight of a screen of a device in response to detecting that a user is not engaged based on the predicted input gaze direction and magnitude.

Example 30 includes the computer-readable medium of any one of examples 21 to 29, including or excluding optional features. In this example, the computer-readable medium includes instructions to receive a predicted input gaze direction and magnitude from the trained network and using the predicted input gaze direction and magnitude as input to control an application.

Example 31 is a system for correcting gaze in images. The system includes an image receiver to receive an image including an eye and a target angle set to a center. The system also includes a bidirectionally trained convolutional neural network (CNN) to receive the image and the target angle from the image receiver and generate a vector field and a brightness map based on the image and the target angle. The system further includes an image corrector to generate a gaze corrected image based on the vector field and the brightness map.

Example 32 includes the system of example 31, including or excluding optional features. In this example, the image corrector is to warp the input image based on the vector field to generate the gaze corrected image.

Example 33 includes the system of any one of examples 31 to 32, including or excluding optional features. In this example, the image corrector is to adjust a local brightness of the warped image based on the brightness map to generate an enhanced gaze corrected image.

Example 34 includes the system of any one of examples 31 to 33, including or excluding optional features. In this example, the system includes a gaze predictor to predict a gaze direction and a magnitude based on the vector field.

Example 35 includes the system of any one of examples 31 to 34, including or excluding optional features. In this example, the system includes a gaze predictor to compute a mean motion vector based on the vector field.

Example 36 includes the system of any one of examples 31 to 35, including or excluding optional features. In this example, the system includes a gaze predictor to negate a direction of motion vector and a scale a magnitude of mean motion vector to fit a screen of the apparatus.

Example 37 includes the system of any one of examples 31 to 36, including or excluding optional features. In this example, the system includes a gaze predictor to generate an estimated input gaze based on a scaled mean motion vector.

Example 38 includes the system of any one of examples 31 to 37, including or excluding optional features. In this example, the system includes a temporal filter to temporally filter the motion vectors in the vector field that are used to warp the input images.

Example 39 includes the system of any one of examples 31 to 38, including or excluding optional features. In this example, the system includes a power saving module to save power by dimming a screen in response to detecting that a user is looking away from the screen.

Example 40 includes the system of any one of examples 31 to 39, including or excluding optional features. In this example, the bidirectionally trained CNN is trained based on a synthetic data set including glasses of different sizes and shapes superimposed on some image sets to increase dataset diversity.

Example 41 is a system for correcting gaze in images. The system includes means for receiving an image including an eye and a target angle set to a center. The system also includes means for generating a vector field and a brightness map based on the image and the target angle. The system further includes means for generating a gaze corrected image based on the vector field and the brightness map.

Example 42 includes the system of example 41, including or excluding optional features. In this example, the means for generating the gaze corrected image is to warp the input image based on the vector field to generate the gaze corrected image.

Example 43 includes the system of any one of examples 41 to 42, including or excluding optional features. In this example, the means for generating the gaze corrected image is to adjust a local brightness of the warped image based on the brightness map to generate an enhanced gaze corrected image.

Example 44 includes the system of any one of examples 41 to 43, including or excluding optional features. In this example, the system includes means for predicting a gaze direction and a magnitude based on the vector field.

Example 45 includes the system of any one of examples 41 to 44, including or excluding optional features. In this example, the system includes means for computing a mean motion vector based on the vector field.

Example 46 includes the system of any one of examples 41 to 45, including or excluding optional features. In this example, the system includes means for negating a direction of motion vector and a scale a magnitude of mean motion vector to fit a screen of the apparatus.

Example 47 includes the system of any one of examples 41 to 46, including or excluding optional features. In this example, the system includes means for generating an estimated input gaze based on a scaled mean motion vector.

Example 48 includes the system of any one of examples 41 to 47, including or excluding optional features. In this example, the system includes means for temporally filtering the motion vectors in the vector field that are used to warp the input images.

Example 49 includes the system of any one of examples 41 to 48, including or excluding optional features. In this example, the system includes means for saving power by dimming a screen in response to detecting that a user is looking away from the screen.

Example 50 includes the system of any one of examples 41 to 49, including or excluding optional features. In this example, the means for generating the vector field and the brightness map includes a bidirectionally trained CNN trained based on a synthetic data set including glasses of different sizes and shapes superimposed on some image sets to increase dataset diversity.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:
1. An apparatus comprising:
memory; and
one or more processors to:
    access an image including an eye and a target angle, the target angle set to a center;

implement a bidirectionally trained convolutional neural network (CNN) to generate a vector field and a brightness map based on the image and the target angle;
compute a mean motion vector based on the vector field; and
generate a gaze corrected image based on the mean motion vector, vector field, and the brightness map.

2. The apparatus of claim 1, wherein the one or more processors are to warp the input image based on the vector field to generate the gaze corrected image.

3. The apparatus of claim 1, wherein the one or more processors are to adjust a local brightness of the warped image based on the brightness map to generate an enhanced gaze corrected image.

4. The apparatus of claim 1, wherein the one or more processors are to predict a gaze direction and a magnitude based on the vector field.

5. The apparatus of claim 1, wherein the one or more processors are to temporally filter motion vectors in the vector field that are used to warp the input images.

6. The apparatus of claim 1, wherein the one or more processors are to save power by dimming a screen in response to detecting that a user is looking away from the screen.

7. The apparatus of claim 1, wherein the bidirectionally trained CNN is trained based on a synthetic data set including glasses of different sizes and shapes superimposed on at least some image sets to increase dataset diversity.

8. An apparatus comprising:
memory; and
one or more processors to:
access an image including an eye and a target angle, the target angle set to a center;
implement a bidirectionally trained convolutional neural network (CNN) to generate a vector field and a brightness map based on the image and the target angle;
negate a direction of a motion vector;
scale a magnitude of a mean motion vector to fit a screen; and
generate a gaze corrected image based on the vector field, the brightness map, the motion vector, and the magnitude of the mean motion vector.

9. An apparatus comprising:
memory; and
one or more processors to:
access an image including an eye and a target angle, the target angle set to a center;
implement a bidirectionally trained convolutional neural network (CNN) to generate a vector field and a brightness map based on the image and the target angle;
generate an estimated input gaze based on a scaled mean motion vector; and
generate a gaze corrected image based on the vector field, the brightness map, and the estimated input gaze.

10. A method for correcting gaze in images, the method comprising:
determining, via one or more processors implementing a trained network, a vector field and a brightness map based on an eye and a target angle set, the target angle to a center of an image;
computing a mean motion vector based on the vector field;
scaling a magnitude of the mean motion vector to fit a screen;
generating an estimated input gaze based on the scaled mean motion vector; and
warping, via the one or more processors, the input image based on vector field to generate a gaze corrected image.

11. The method of claim 10, further including bidirectionally training the network to generate vector fields and brightness maps based on simulated input images.

12. The method of claim 10, further including bidirectionally training the network based on simulated input images including superimposed glasses of different sizes and shapes.

13. The method of claim 10, further including adjusting, via the one or more processors, a local brightness of the warped image based on the brightness map to generate an enhanced gaze corrected image.

14. The method of claim 10, further including predicting a gaze direction and magnitude based on the vector field.

15. The method of claim 10, further including negating a direction of a motion vector.

16. The method of claim 10, wherein the warping of the input image includes resizing the input image to a predetermined size.

17. The method of claim 10, further including temporally filtering motion vectors in the vector field that are used to warp the input image.

18. The method of claim 10, further including dimming a backlight of a screen of a device in response to detecting that a user is not engaged based on a predicted input gaze direction and magnitude from the trained network.

19. The method of claim 10, further including using a predicted input gaze direction and magnitude, from the trained network, as input to control an application.

20. At least one computer readable storage device comprising instructions that, when executed, cause one or more processors to at least:
access an image including an eye and a target angle, the target angle set to a center;
implement a bidirectionally trained convolutional neural network (CNN) to generate a vector field and a brightness map based on the image and the target angle;
compute a mean motion vector based on the vector field; and
generate a gaze corrected image based on the mean motion vector, the vector field, and the brightness map.

21. The at least one computer readable storage device of claim 20, wherein the instructions cause the one or more processors to bidirectionally train the network to generate vector fields and brightness maps based on simulated input images.

22. The at least one computer readable storage device of claim 20, wherein the instructions cause the one or more processors to warp the input image based on the vector field to generate the gaze corrected image.

23. The at least one computer readable storage device of claim 20, wherein the instructions cause the one or more processors to adjust a local brightness of the warped image based on the brightness map to generate an enhanced gaze corrected image.

24. The at least one computer readable storage device of claim 20, wherein the instructions cause the one or more processors to predict a gaze direction and magnitude based on the vector field.

* * * * *